United States Patent [19]

Hartwig

[11] 4,404,509
[45] Sep. 13, 1983

[54] DEVICE FOR CONTROLLING THE DRIVE OF A STEPPING MOTOR, TO ADJUST THE LATERAL STITCH BIGHT AND/OR THE FEED LENGTH OF A SEWING MACHINE

[75] Inventor: Jürgen Hartwig, Ettlingen, Fed. Rep. of Germany

[73] Assignee: Pfaff Hauschaltmaschinen GmbH, Fed. Rep. of Germany

[21] Appl. No.: 184,744

[22] Filed: Sep. 8, 1980

[30] Foreign Application Priority Data

Oct. 24, 1979 [DE] Fed. Rep. of Germany ....... 2942844

[51] Int. Cl.[3] .............................................. G05B 19/40
[52] U.S. Cl. ................................... 318/685; 318/696; 318/318; 112/121.12
[58] Field of Search ....................... 318/696, 685, 318; 112/121.12

[56] References Cited

U.S. PATENT DOCUMENTS

| | | | |
|---|---|---|---|
| 3,575,653 | 4/1971 | Gucwa | 318/601 X |
| 3,654,882 | 4/1972 | Kamena | 318/696 X |
| 3,742,879 | 7/1973 | Schaefer et al. | 318/696 X |
| 3,771,477 | 11/1973 | Conner | 318/696 X |
| 3,822,658 | 7/1974 | Conner | 318/696 X |
| 3,885,210 | 5/1975 | Burnett | 318/696 |
| 3,986,466 | 10/1976 | Herzer | 112/121.12 |
| 4,121,145 | 10/1978 | Talmadge | 318/696 |
| 4,264,848 | 4/1981 | Jansen | 318/685 X |

Primary Examiner—B. Dobeck
Attorney, Agent, or Firm—McGlew and Tuttle

[57] ABSTRACT

A device for controlling the drive of a stepping motor to adjust the lateral stitch bight and/or the feed length of a sewing machine comprising apparatus connected to the stepping motor for rendering the stepping frequency of the stepping motor variable as a function of the speed of the sewing machine. The apparatus comprises a microcomputer which is connected to a pulse transmitter for transmitting pulses proportional to the speed of the sewing machine.

3 Claims, 9 Drawing Figures

DEVICE FOR CONTROLLING THE DRIVE OF A STEPPING MOTOR, TO ADJUST THE LATERAL STITCH BIGHT AND/OR THE FEED LENGTH OF A SEWING MACHINE

FIELD AND BACKGROUND OF THE INVENTION

The present invention relates in general to sewing machine controls, and in particular to a new and useful device for controlling the drive of a stepping motor which is provided to adjust the lateral stitch bight and/or the feed length of a sewing machine which is connected to the stepping motor for varying the frequency of the stepping motor as a function of the speed of the sewing machine.

The control device for a stepping motor in a sewing machine of the prior art has the drawback that due to the strong current increase in the windings of the motor and, consequently, the very rapid acceleration and deceleration both of the motor and the driven external masses during the jerky execution of the rotary steps, a very big noise is produced. In addition, resonances appear at certain frequency steps of the stepping motor and oscillations are produced about the respective dwell position, further raising the noise level.

SUMMARY OF THE INVENTION

The present invention is directed to a control device for a stepping motor for reducing the noise produced by the stepping motor substantially below the noise level range resulting from the operation of the sewing machine, without affecting the drive properties of the stepping motors. Hence, at low speeds of the sewing machine with a low noise level, little noise is produced by the stepping motor, since its stepping frequency is low. Also, because of the low speed of the sewing machine, a longer period of time is allotted for the operation of the stepping motor, so that no additional problems arise. At higher speeds of the sewing machine, a higher noise level of the stepping motor may be tolerated, since this noise is drowned out by the fundamental noise produced by the sewing machine.

The stepping frequency of the stepping motor may be varied continuously or gradually, as a function of the motor speed.

Accordingly, an object of the present invention is to provide a device for controlling the drive of a stepping motor for adjusting the lateral stitch bight and/or feed length of a sewing machine comprising means connected to the stepping motor for rendering the stepping frequency of the stepping motor variable as a function of the speed of the sewing machine.

A further object of the present invention is to provide such means which comprise a microprocessor connected to a pulse transmitter which in turn is connected to a drive for the sewing machine.

Due to the inventive control, the individual steps to be executed by the motor are not performed abruptly, but gradually, in a plurality of uniform intermediate steps. In addition, the number of required component parts is substantially reduced as compared to the prior art (German OS No. 28 03 201), so that the control can be accommodated even in the minimum space available in sewing machines. The provided solution has the further advantage that a slow start and run-down of the stepping motor can be included in the control program, wihtout the otherwise necessary switching.

A further object of the present invention is to provide a control for the drive of a stepping motor of a sewing machine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

One embodiment of the invention is illustrated in the drawings in which.

DESCRIPTION OF THE PREFERRED EMBODIMENT

Figure 1:
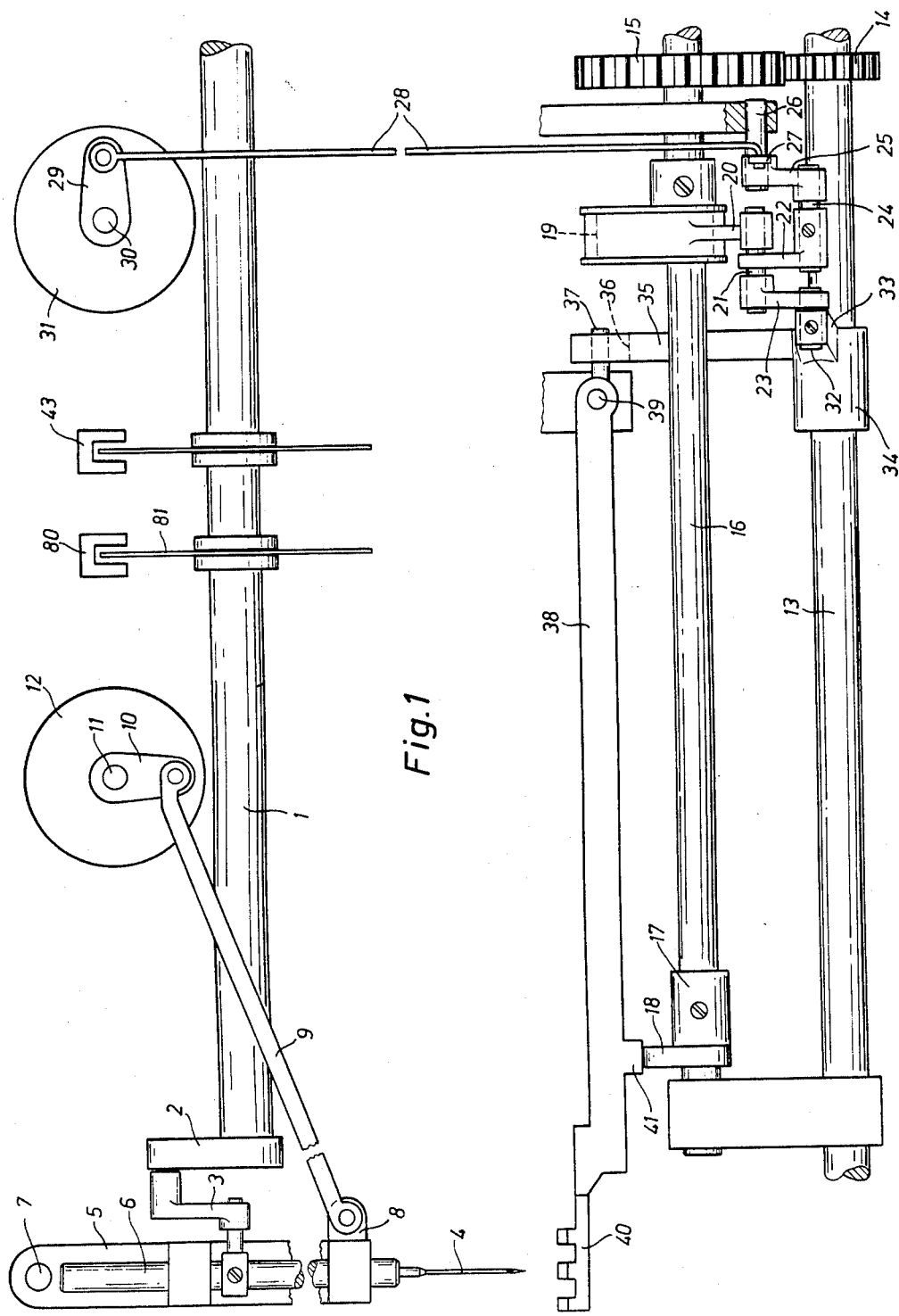
FIG. 1 is an elevational view of a sewing machine with stepping motors providing a drive for the lateral stitch bight and feed length adjustments.

As shown in FIG. 1 the sewing machine comprises a main shaft 1 by which, through a crank 2 and a link 3, vertical reciprocating motion is imparted to a needle bar 6 which is guided in a swing arm 5 and equipped with a needle 4. Swing arm 5 is mounted on the housing (not shown) of the sewing machine by means of a pivot pin 7.

Swing arm 5 has an extension 8 which is connected, through a link 9, to a crank 10, which is secured to the shaft 11 of a stepping motor 12 which is accommodated in the housing of the sewing machine and intended for controlling the lateral stitch bight of needle 4.

Main shaft 1 drives a lower shaft 13 through a chain (not shown). A gear 14 is secured to shaft 13 and meshes with a gear 15 which, in turn, is secured to shaft 16 extending parallel to shaft 13. A lifting eccentric 17 carrying a cam 18 is screwed to shaft 16. Further secured to shaft 16 is an eccentric 19 carrying an eccentric bar 20 to which two links 22 and 23 are hinged by means of a bolt 21. Link 22 is rotatably connected through a bolt 24 to a bell crank lever 25 which is mounted for rotation on a pivot pin 26 fixed to the housing of the sewing machine and is connected, through one of its arms 27 and a rod 28, to a crank 29 which is secured to the shaft 30 of a second stepping motor 31 accommodated in the housing of the sewing machine and intended for controlling the stitch length of the sewing machine.

Link 23 is hinged by means of a bolt 32 to an arm 33 of a swing lever 34 which is mounted on shaft 13. Another, upwardly projecting arm 35 of swing lever 34 is provided on its end with a guide slot 36 in which a pin 37 is guided. Pin 37 is secured to a supporting arm 38 which is mounted for displacement on a horizontal pin 39 fixed in the housing of the sewing machine and extending in the feed direction. On its free end, supporting arm 38 carries a feed dog 40 for advancing the work which is sewn by the needle 4 in cooperation with a rotary hook (not shown). Supporting arm 38 rests through a downwardly projecting rib 41 against cam 18 of lifting eccentric 17.

The two stepping motors 12 and 31 are identical in design and in their fundamental control. A description of the control of stepping motor 12 will therefore, be sufficient for understanding.

Figure 2:
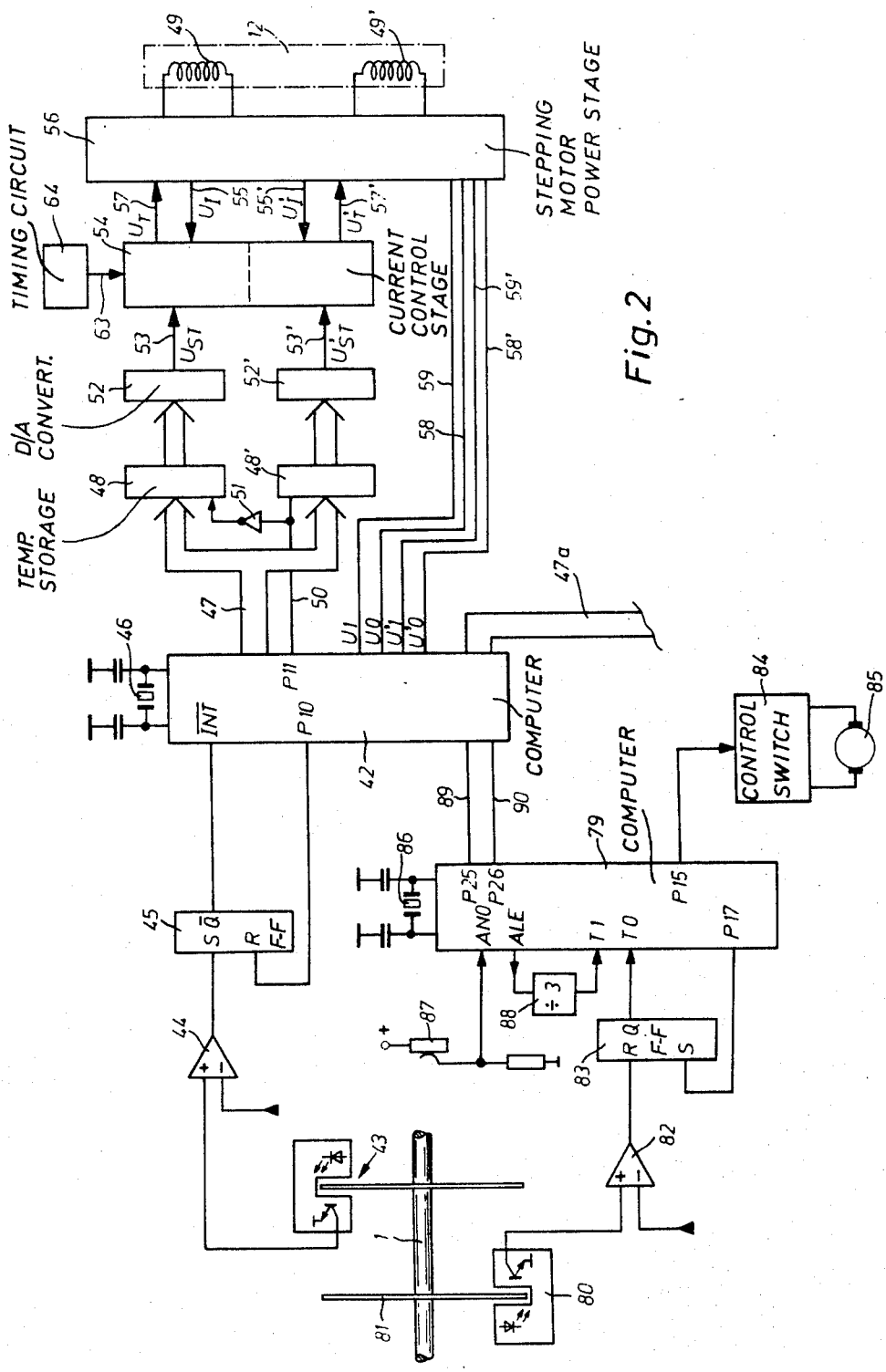
FIG. 2 is a block diagram showing the control of the stepping motor.

Stepping motor 12, which is intended for controlling the lateral throw of swing arm 5 relative to a central position, is designed as a stepping motor of the bipolar chopper phase type. It is controlled by a microcomputer 42 (FIG. 2) in whose memory a plurality of sewing patterns of any desired kind is stored.

A pulse transmitter 43 is connected to microcomputer 42 which is controlled by the main shaft 1 of the sewing machine and delivers a pulse at every revolution of the shaft, as soon as needle 4 disengages from the work and stepping motor 12 is able to change the position of the needle bar. To standardize the pulse, it is delivered to a comparator 44 having its output connected to the setting input S of a flip-flop switch 45. The resetting input R of flip-flop switch 45 is connected to an output P10 of microcomputer 42, and the Q output of flip-flop switch 45 is connected to the INT input of microcomputer 42.

Also connected to a microcomputer 42 is a quartz resonator 46 furnishing a pulsatory output voltage.

Microcomputer 42 is connected through a group of eight data lines 47 to temporary storages 48 and 48' for transmitting the control operations for the two section windings 49 and 49' of stepping motor 12 which are operated under constant current chopper control. Further, an output P11 of microcomputer 42 is connected, through a line 50, to temporary storage 48' and, through a negation element 51 provided in line 50, to temporary storage 48.

Since the control circuits between temporary storages 48, 48' and section windings 49, 49' are identical, only the control for section winding 49 is described in the following. In both control circuits like reference numerals denote like elements.

Temporary storage 48 is followed by a digital-to-analog converter 52 in which a stepped-off or control voltage $U_{ST}$ is produced. This voltage is applied through a line 53 to a current control stage 54 where it is compared with an actual voltage $U_I$ delivered from a stepping motor power stage 56 through a line 55. In current control stage 54, a timing voltage $U_T$ is produced and applied through a line 57 to power stage 56. The two section windings 49, 49' of stepping motor 12 are connected to the power stage 56 of the stepping motor. Microcomputer 42 and power stage 56 are further connected to each other by lines 58 and 59 for transmitting switching voltages $U_0$ and $U_1$. In addition, current control stage 54 is connected to a timing circuit 64 through a line 63.

Through another group of lines 47a, microcomputer 42 is connected to a control circuit for stepping motor 31. This control circuit is identical with the control circuit for stepping motor 12 and therefore, not shown, for reasons of clarity.

Figure 3:
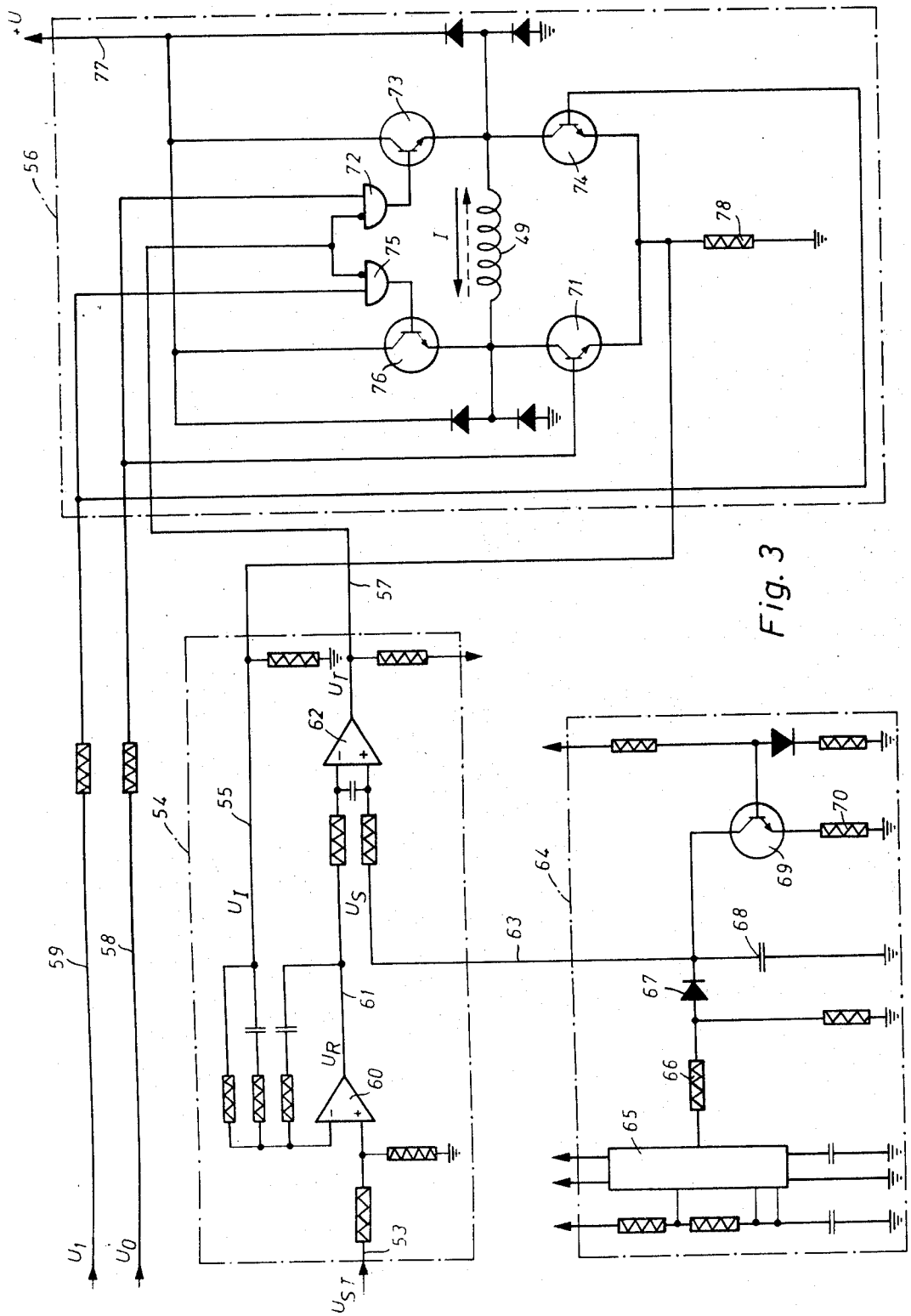
FIG. 3 is a simplified circuit diagram of the current control and of the end stage of a section winding of the stepping motor.

In current control stage 54 (FIG. 3), an operational amplifier 60 connected as PID controller is provided, and line 53 is connected to the non-inverting input thereof. The inverting input of operational amplifier 60 is connected through an RC combination to line 55. The output of amplifier 60 is connected through a line 61 to the inverting input of a comparator 62, and the non-inverting input of comparator 62 is connected, through line 63 to the time switch circuit 64 delivering a sawtooth voltage $U_S$. The output of comparator 62 is connected through line 57 to the power stage 56 of the stepping motor 12.

Timing circuit 64 comprises a timer 65 which is connected through a resistor 66 and a diode 67 to a capacitor 68 which also is connected to line 63. A discharge circuit comprising a transistor 69 and resistor 70 is connected in parallel to capacitor 68.

In microcomputer 42, the switching voltages $U_0$ and $U_1$ are produced which are supplied through lines 58 and 59 to the power stage 56 of the stepping motor. Under the control of microcomputer 42, switching voltages $U_0$ and $U_1$ may assume the values of 1 or 0.

Line 58 is connected to the base of a switching transistor 71 and, through an AND gate 72, to the base of a switching transistor 73. Line 57 is connected to the inverting input of AND gate 72. Line 59 is connected to the base of a switching transistor 74 and, through an AND gate 75, to the base of switching transistor 76, with line 57 also being connected to the inverting input of AND gate 75. Switching transistors 71, 73, 74, 76 operate as switches for switching on and off or reversing the operating current for section winding 49, and form a bridge circuit with section winding 49 being connected in the bridge diagonal.

The collectors of switching transistors 73 and 76 are connected to a supply line 77 for the operating current. The emitters of switching transistors 71 and 74 are connected to a measuring resistor which is grounded and to which line 55 is connected for tapping the actual voltage $U_I$.

To adjust the stepping frequency of stepping motors 12 and 31 to the speed of the machine, a second microcomputer 79 is provided (FIG. 2), which, in addition, is intended for controlling the machine speed. Microcomputer 79 is connected to a pulse transmitter 80 receiving pulses from a slotted disc 81 which is secured to arm shaft 1 of the machine and provided with slots 96. The pulses delivered to a comparator 82 having its output connected to the resetting input R of a flip-flop switch 83. The setting input S of flip-flop switch 83 is connected to the output P17 of microcomputer 79 and the Q output of flip-flop switch 83 connects to the input T0 of microcomputer 79.

Microcomputer 79 is connected to a control circuit 84 for a drive motor 85 which is connected to arm shaft 1 of the sewing machine through a drive belt (not shown). Further connected to the microcomputer are a quartz resonator 86 and a foot-operated starter 87. As mentioned, microcomputer 79 is also intended for controlling and stabilizing the speed of the sewing machine which in each instance is predetermined by the foot-operated starter 87. The ALE output of microcomputer 79 is connected to a frequency divider 88 having its output applied to the T1 input of computer 79. Outputs P25 and P26 of microcomputer 79 are connected through two lines 89 and 90 to microcomputer 42, in order to transmit thereto information on the speed.

The device operates as follows:

Be it assumed that switching voltage $U_0$ of line 58 (FIG. 3) has the value 1, switching voltage $U_1$ of line 59, the value 0 and that the timing voltage $U_T$ of line 57 is also at the level 0. Due to the level 0 of line 59, the two switching transistors 74 and 76 are disabled. Level 1 of line 58 enables switching transistors 71 and 73, since a signal 1 appears at the output of AND gate 72 due both to line 58 and to line 57 connected the the inverting input. Consequently, operating current flows from line 77 through switching transistor 73, section winding 49, switching transistor 71, and measuring resistor 78 to ground. A voltage drop develops across measuring resistor 78, which is applied as actual voltage $U_I$ through line 55 to operational amplifier 60 where it is compared with the control voltage $U_{ST}$ on line 53. Operational amplifier 60, which is connected as PID controller, produces therefrom a control voltage $U_R$ which is applied through line 61 to comparator 62 and then compared with the saw-tooth voltage $U_S$ delivered by timing circuit 64.

Timer 65 produces rectangular-wave pulses of constant frequency by which capacitor 68 is charged through resistor 66 and diode 67. During the pulse intervals, capacitor 68 is discharged through transistor 69 and resistor 70. This results in a saw-tooth voltage $U_S$ at capacitor 68 which is supplied through line 63 to comparator 62. The timing voltage $U_T$ appearing at the output of comparator 62 is supplied to the two AND gates 72 and 75.

Figure 5:
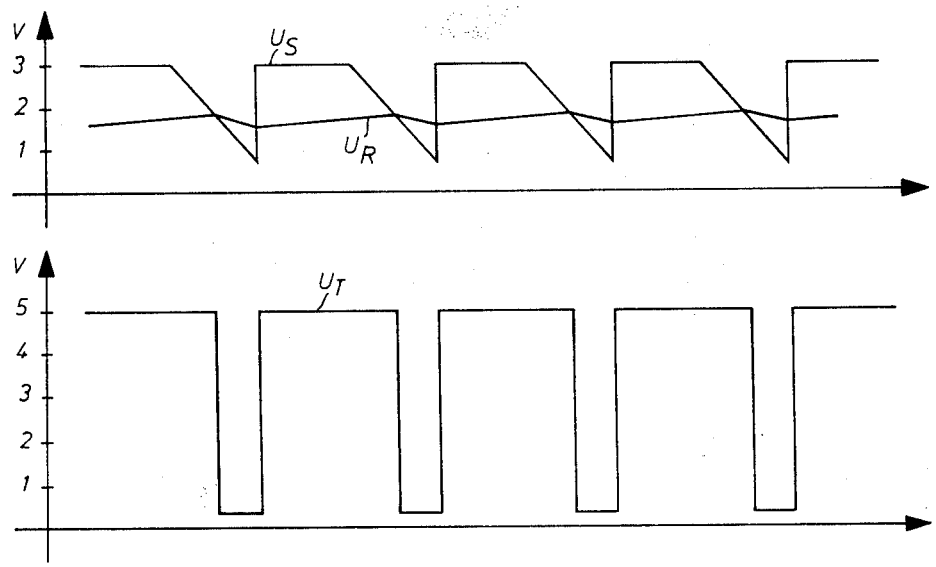
FIG. 5 is a set of graphs which show the variation in the current control circuit.

FIG. 5 shows the variation of the two voltages $U_R$ and $U_S$ at comparator 62. As soon as the value of saw-tooth voltage $U_S$ exceeds that of control voltage $U_R$, comparator 62 switches and timing voltage $U_T$ at the output thereof assumes the level 1. This results in a 0 level at the output AND gate 72 and switching transistor 73 is disabled. The current flow through section winding 49 is thereby interrupted, with the result that actual voltage $U_I$ drops and control voltage $U_R$ slightly rises. As soon as saw-tooth voltages $U_S$ drops below control voltage $U_R$, the output of comparator 62 switches to 0, the output of AND gate 72 reassumes level 1 and enables switching transistor 73 again. The pulse intervals of timing voltage $U_T$ and, consequently, the periods of conduction of switching transistor 73 vary in proportion to the control voltage $U_R$, and the section current I varies accordingly. The pulse duty factor of timing voltage $U_T$ adjusts in such a way that the section current I becomes a replica of control voltage $U_{ST}$.

To minimize the noise produced by stepping motor 12, a close to continuous motion of the rotor of motor 12 is provided, instead of a graduated one. This is obtained by a trapezoidal variation of section currents I and I' of the two section windings 49 and 49', which ordinarily have a rectangular-wave shape. The individual stepping motions of the rotor are not executed abruptly but through a plurality of uniform intermediate steps into which a complete step is subdivided, so that in practice, the rotor rotates almost uniformly. This is obtained by controlling the section currents I and I' of section windings 49, 49' of stepping motor 12 in such a manner that they do not have a rectangular, but instead have a trapezoidal or staircase wave form.

Figure 4:
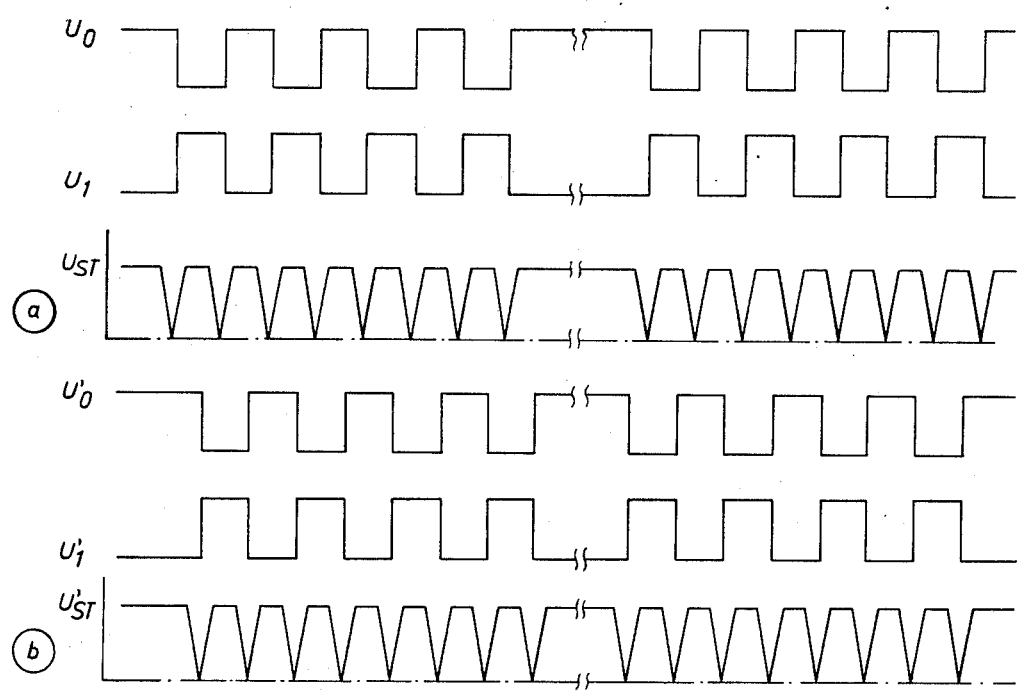
FIG. 4 is a set of graphs which show the variation of the control and the level voltages as well as of the section currents of the two section windings of the motor, and the angle of rotation of its rotor.
Figure 4:
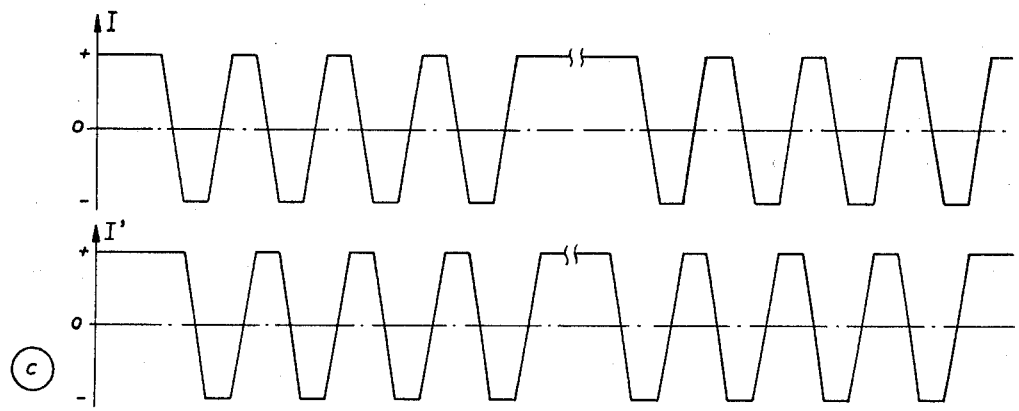
Figure 4:
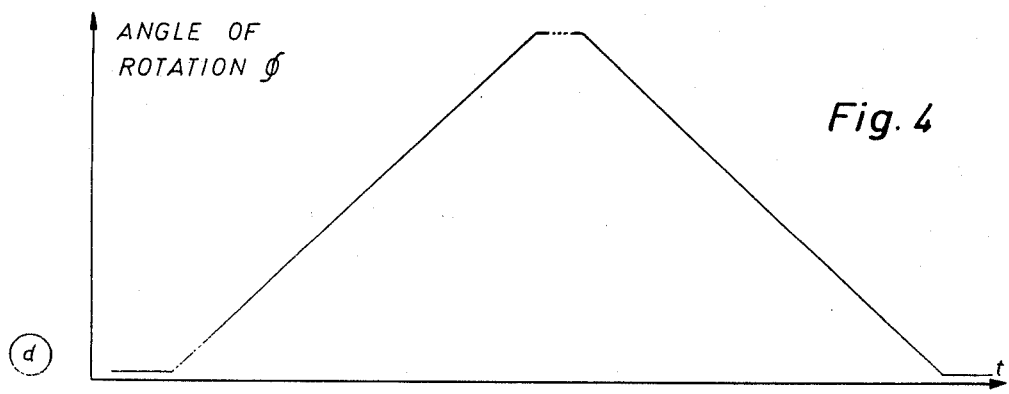

FIG. 4 is intended to explain this control. Be it assumed that the rotor is stopped and the two section currents I, I' are at their positive nominal value (diagrams c and d). Section current I of section winding 49 is now linearly decreased to 0. The rotor is rotated along proportionally. As soon as section current I of section winding 49 drops to 0, the current direction is reversed by changing switching voltage $U_0$ and $U_1$. Section current I is then decreased linearly to its negative nominal value, with the rotor still continuously rotating along. After that, section current I of section winding 49 is kept at its negative nominal value while section current I' of section winding 49' is linearly decreased to 0, then the current direction is reversed by changing switching voltages $U'_0$ and $U'_1$ and section current I' is linearly increased again up to its positive nominal value, whereupon the described cycle is repeated. During these variations, the rotor continues to rotate linearly along; it does not execute its normal stepping motion, its steps are subdivided into minimum-size intermediate steps. The production of noise is minimized and no resonances appear in practice.

The linear decrease and increase of amplitudes of the section currents I, I' is obtained by means of the two control voltages $U_{ST}$ and $U'_{ST}$ (diagrams a and b) for section windings 49 and 49'. They must have the saw-tooth wave form shown in FIG. 4 and, of course, must be displaced in phase relative to each other. FIG. 4 also shows how the phase relationship of switching voltages $U_0$ and $U_1$ on lines 58 and 59 and of the control voltage $U_{ST}$ for section winding 49 produced in the digital-to-analog converter 52, on the one hand, and of switching voltages $U'_0$ and $U'_1$ and the control voltage $U'_{ST}$ for section winding 49', on the other hand, determine the direction of rotation of stepping motor 12 whose instantaneous angles of rotation $\phi$ are plotted against time in diagram d of FIG. 4.

Figure 9:
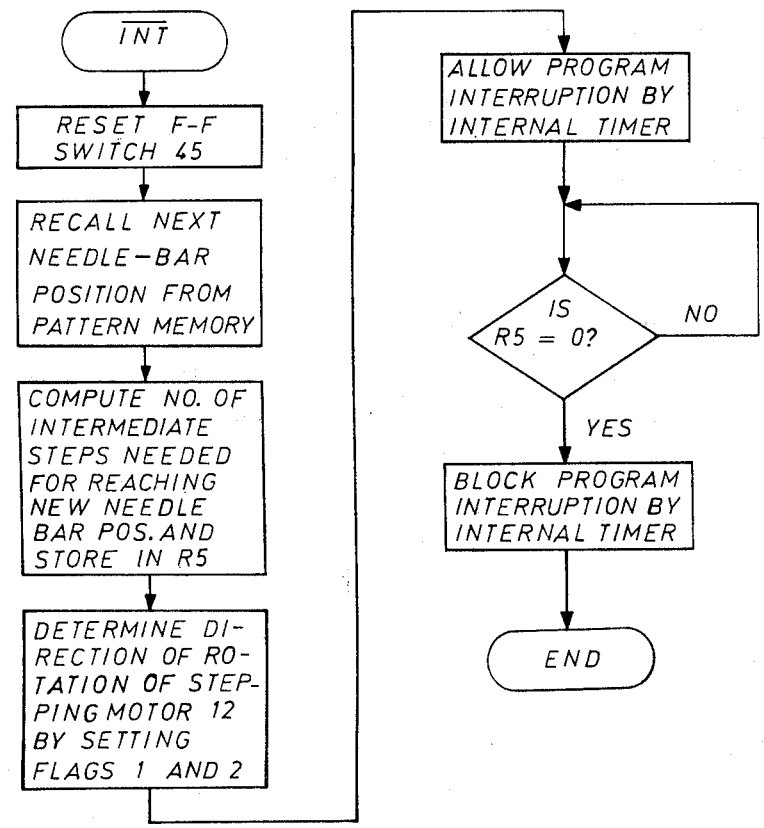
FIGS. 6 to 9 are flow charts with details of processing steps involved in the programs stored in the program registers of the microcomputer.

The control voltage $U_{ST}$ for section winding 49 (FIG. 2) is produced by microcomputer 42. At every revolution of main shaft 1, pulse transmitter 43 delivers a pulse by comparator 44 to flip-flop switch 45, thereby causing the Q output thereof to assume the state 0 so that, through INT of microcomputer 42, the program is interrupted. A subroutine INT is started. In this subroutine (FIG. 9), first, flip-flop switch 45 is reset by a short pulse delivered from output P10 of microcomputer 42 to the input R of flip-flop switch 45. Then, the value of the next needle bar position is recalled from the pattern memory and the number of intermediate steps to be executed by stepping motor 12 is computed therefrom and stored in a register, for example, R5, serving as counter, and the direction of rotation to be followed by stepping motor 12 is determined by correspondingly setting or resetting flags 1 and/or 2. Thereupon, the internal timer of microcomputer 42 is permitted to interrupt the program until the number of intermediate steps to be performed is exhaused, i.e. until the contents of register R5 decrease to 0. Thereafter, the program interruption by the timer is inhibited again.

Figure 6:
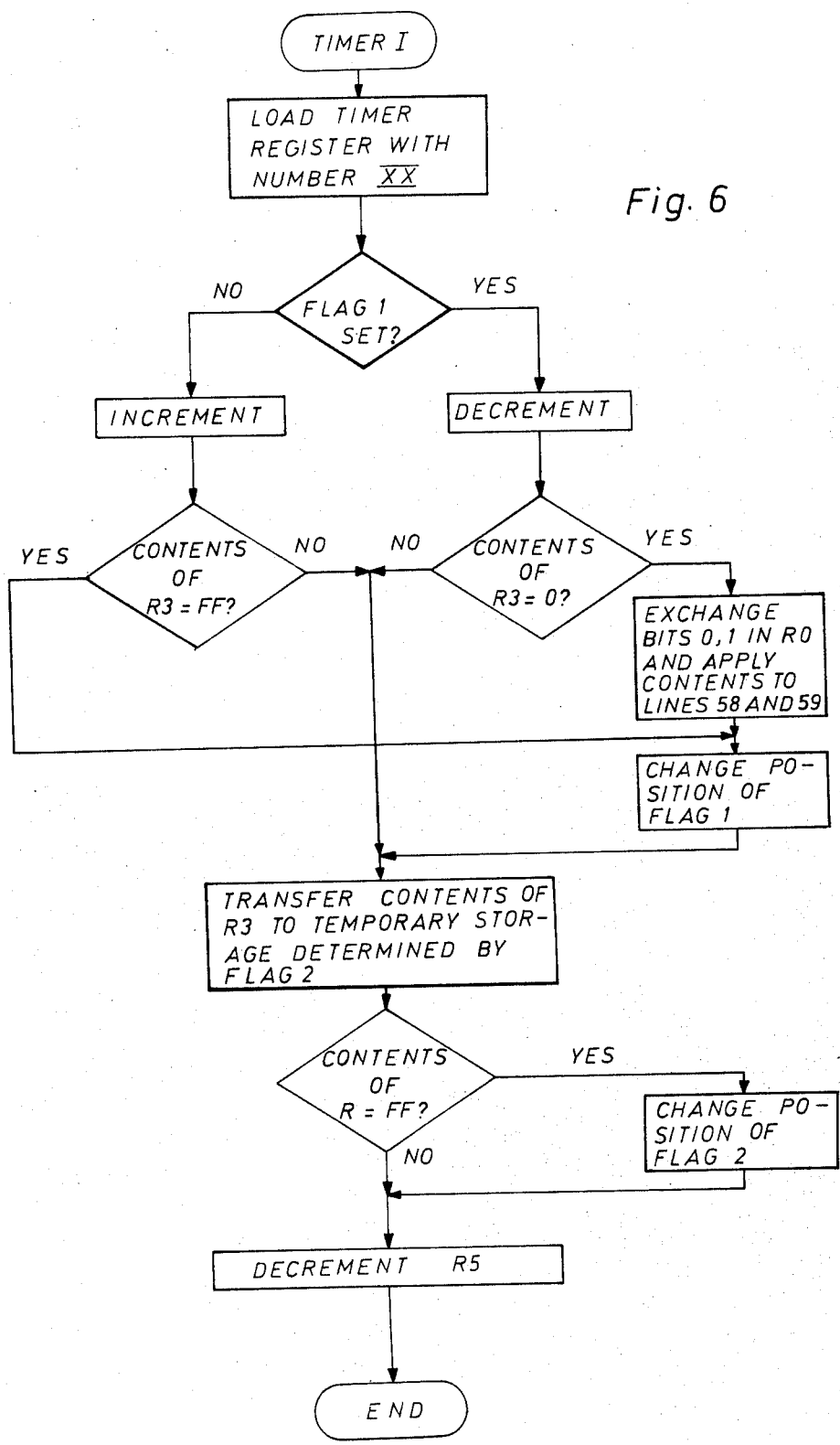

The timer provided in microcomputer 42, is an 8-bit counter and receives pulses from quartz resonator 46 through two internal pulse dividers in the ratio of 1 to 480. The frequency of quartz resonator 46 is reduced by the pulse dividers from 6 mHz to 12.2 kHz. Every counting pulse of the fixed frequency of 12.5 kHz increases the contents of the timer by 1. If FF overflows to 00, the timer interrupts the program and the subroutine "timer I" (FIG. 6) is executed.

The timer may be pre-loaded with a number (00 to FF) to determine the instant of interruption by the timer. For this purpose, the timer register in the subroutine "timer I" is recurrently pre-loaded to the desired value, to obtain the next interruption after the same period of time. For example, be it assumed that register R0 is intended for determining switching voltages $U_0$, $U_1$ on lines 58 and 59, that register R3 is used as a counter for the control voltage $U_{ST}$ to be produced, and that register R5 serves as a counter of the intermediate steps and, further, that the two temporary storages 48, 48' have stored a number FF in the hexadecimal system. Accordingly, the number FF is stored in register R3. Stepping motor 12 is supposed to be stopped.

To rotate the armature of stepping motor 12, initially to control voltage $U_{ST}$ for section winding 49, for example, is time-linearly reduced to 0. To this end subroutine "timer I" is called in by which a rotation of the rotor of stepping motor 12 through a single intermediate step is effected at every run, and which is repeated until the number of intermediate steps required to reach the new position of needle bar 5 is executed by stepping motor 12.

In the "timer I" subroutine, the timer register is loaded with a number predetermined by microcomputer 79, and the position of flag 1 is tested. If flag 1 is set, the contents of register R3 are to be decremented. If flag 1 is reset, the contents of register R3 are incremented. If the test shows that flag 1 is set, register R3 is decremented by 1.

This is followed by a second test for the 0 contents of register R3. With 0 in register R3, the bits 0 and 1 in register R0 are mutually exchanged and applied to lines 58 and 59 (see also FIG. 2). Thereupon, the position of flag 1 is changed.

The contents of register R3 are then transferred to that temporary storage 48 or 48' which is determined by flag 2. For this purpose, the position of flag 2 is tested in line 50.

If flag 2 is set, the contents of register R3 are transferred through negation element 51 to temporary storage 48, if flag 2 is reset, they are transferred to temporary storage 48'. Further provided is a third test. With the contents of register R3 being FF, the position of flag 2 is changed, otherwise its position is maintained. Finally, register 5 counting the intermediate steps, is decremented. The subroutine is thus terminated and its next run can start as soon as prompted by the timer.

If in the first test mentioned above, flag 1 is reset, register R3 is incremented by 1. This also is followed by a second test determining whether or not the contents of register R3 are FF. With a positive result of the test, the position of flag 1 is changed and the program continues, in the same way as upon a negative test, by transferring the contents of register R3 to one of the temporary storages 48 or 48', as described above.

Be it assumed that during the transfer of contents of register R3 to temporary storage 48 (FIGS. 2 and 3), these contents have been decremented by 1. The new contents are converted in the following digital-to-analog converter 52 into a new value of control voltage $U_{ST}$, compared in operational amplifier 60 with the actual voltage $U_I$ supplied from the end stage 56 of the stepping motor, and the control voltage $U_R$ is produced therefrom. In accordance with the above-mentioned switching provisions, the change of control voltage $U_R$ also results in a change of section current I of section winding 49 by an intermediate step, with the rotor performing a further rotary motion also corresponding to an intermediate step.

If the contents of register R3, with flag 1 set, reach the value 0, the result of the second test in the "timer" program is positive and bits 0 and 1 in register R0 are exchanged with each other and delivered to lines 58 and 59. Flag 1 is then reset.

By exchanging bits 0 and 1 in register R0, microcomputer 42 changes the switching voltages $U_0$ and $U_1$ applied to lines 58 and 59, so that the switching voltage on line 58 assumes the value 0 and the switching voltage on line 59 assumes the value 1. Due to the level 0 of line 58, the two switching transistors 71 and 73 are inhibited. Level 1 of line 58, on the contrary, enables switching transistor 74 and 76 as the timing voltage $U_T$ applied through line 57 to the inverting input of AND gate 75 is 0. The direction of section current I in section winding 49 is thereby reversed and the current through section winding 49 is increased by the "timer" program gradually up to its maximum nominal value.

If the second test is positive, i.e. as soon as the contents of register R3 are FF, the position of flag 1 is changed again, so that decrementation takes place during the next "timer" program.

At the next step, the contents of register R3 are delivered to temporary storage 48 and register R3 is then tested again for its contents of FF.

Since in the present example this test is positive, the position of flag 2 is changed, so that during the following run of the "timer" program the contents of register R3 are read into temporary storage 48'. This means that during the following steps, control voltage $U_{ST}$ and therefore, section current I for section winding 49 remain at their maximum nominal values, while control voltage $U'_{ST}$ and section current I' for section winding 49' vary stepwise.

In consequence, the subroutine "timer I" called in within a fixed cycle time loads temporary storage 48 with a sequence of data which are converted in the following digital-to-analog converter 52 into voltage $U_{ST}$ for controlling section current I for section winding 49. The same is then completed with temporary storage 48' and digital-to-analog converter 52', to produce voltage $U'_{ST}$ for controlling section current I' for section winding 49'. At the instant at which control voltage $U_{ST}$ or $U'_{ST}$ of one of the section windings 49 or 49' becomes 0, microcomputer 42 reverses the corresponding switching voltages $U_0$ and $U_1$ or $U'_0$ and $U'_1$. Microcomputer 42 then reruns the subroutine "timer I" as many times as required for advancing stepping motor 12 into the programmed position for the next position of the needle bar.

To adjust the stepping frequency of stepping motor 12 to the speed of the sewing machine, microcomputer 72 (FIG. 2) measures the actual speed of the sewing machine and delivers a 2-bit speed information through lines 89 and 90 to microcomputer 42 by which the stepping frequency of stepping motors 12 and 21 is appropriately adjusted to the speed of the sewing machine. In this connection, it is understood that:

0 on line 90 and 0 on line 89 correspond to a machine speed of less than 100 rpm;
  0 on line 90 and 1 on line 89 correspond to a machine speed between 100 rpm and 200 rpm;
  1 on line 90 and 0 on line 89 correspond to a machine speed between 200 rpm and 400 rpm;
  1 on line 90 and 1 on line 89 correspond to a machine speed of more than 400 rpm.

The internal timer of microcomputer 79 is programmed as an event or cycle counter, i.e. its counts every positive edge appearing at input T1. Now, a frequency of 80 kHz is applied to input T1, which is produced from the frequency ALE internal to the computer by a 1 to 3 reduction by an external frequency divider 88. ALE is a frequency produced from the frequency of attached quartz resonator 86 by dividing it internally by 15. This means, since the input frequency is 80 kHz, that the timer is incremented by 1 every 12.5 microseconds.

Reading out the timer or counter register, producing the speed information, and subsequent clearing are effected by software interruption. During every run of the program, input T0 is continually interrogated and then the instant is determined at which the upstream connected flip-flop switch 83 is set by the positive timing pulse edge of pulse transmitter 80.

Figure 8:
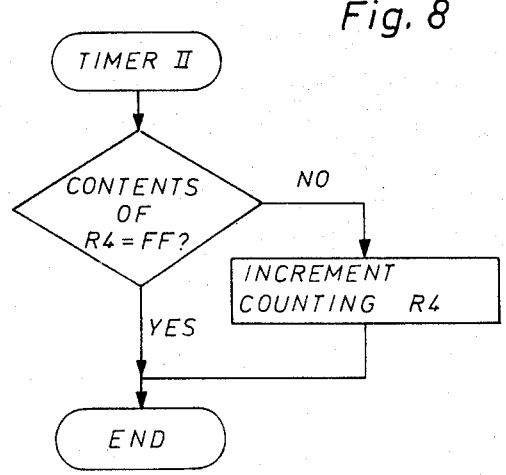

At every positive timing pulse edge produced by slotted disc 81 in pulse transmitter 80, the contents of the timer are recalled, interpreted, and then cleared. The contents of the timer prior to clearing are thus the measure of the time elapsed between two timing pulses initiated by slotted disc 81, and therefore a measure of the speed of the sewing machine. Since with speeds below 200 rpm, the 8 bits of the timer are insufficient for counting all the cycles, an additional counting register R4 is provided for this purpose. The larger the value stored in the two registers, the lower is the speed of the sewing machine. At every timer overflow from FF to 00 at which the timer produces an interruption, the contents of counting register R4 are incremented by 1. This is done in a subroutine "timer II" which is called in by the timer overflow (FIG. 8). An overflow of counting register R4 from FF to 0 at an only low speed of arm shaft 1 is prevented by interrogating the counting register in the subroutine "timer II" for the value FF, since otherwise an overflow of register R4 from FF to 0 would cause misinterpretations.

Figure 7:
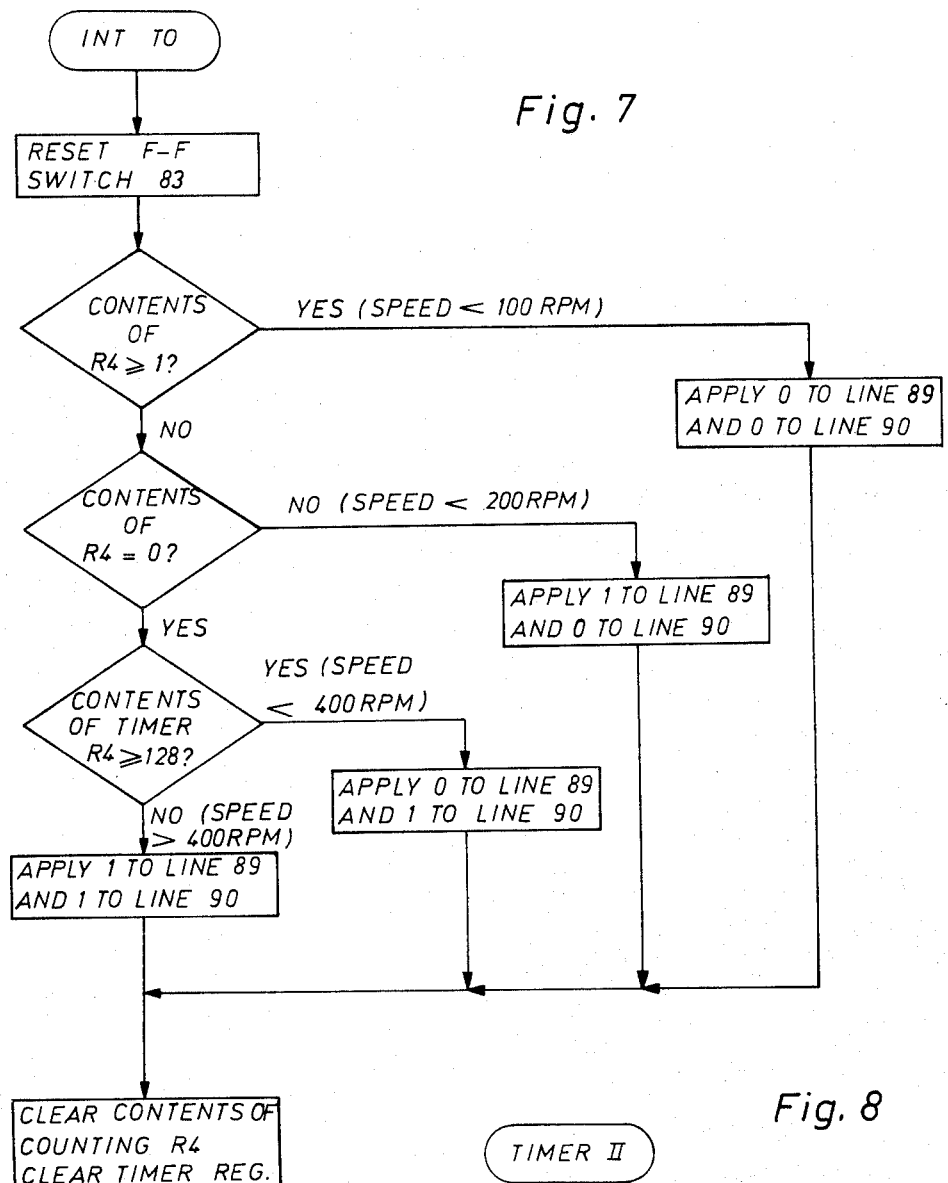

FIG. 7 shows the flowchart of a subroutine "INT T0" for adjusting the stepping frequency of stepping motors 12 and 31 to the speed of the sewing machine. This subroutine is run after flip-flop switch 83 is set by a pulse from slotted disc 81. In this program, the counts of the timer register and of counting register R4 are checked and evaluated. Initially, microcomputer 79 through its output P17 resets flip-flop switch 83. Then counting register R4 is tested for whether its contents are equal to or larger than 1. With a positive result of the test, the machine speed is lower than 100 rpm and microcomputer 79 applies the potential 0 to both lines 89 and 90 leading to microcomputer 42. Thereupon, microcomputer 42 limits the stepping frequency of both stepping motors 12 and 31 to 70 Hz.

With the result of the test being negative, a second test is carried out for whether the contents of counting register R4 are 0. If the test is negative, the machine speed ranges between 100 rpm and 200 rpm and potential 1 is applied through line 89 and potential 0 through line 90 to microcomputer 42 by which the stepping frequency of stepping motors 12 and 31 is increased to 140 Hz.

If the test is positive, the timer register is tested for whether its contents are equal to or larger than 128. With a positive result of the test, the speed of the sewing machine ranges between 200 rpm and 400 rpm and microcomputer 79 applies potential 0 to line 89 and potential 1 to line 90, so that the stepping frequency of stepping motors 12 and 31 is adjusted to 270 Hz by microcomputer 42. With a negative result of the timer register test, the speed of the machine drive exceeds 400 rpm and microcomputer 79 switches the potential 1 to both lines 89 and 90, thereby delivering a corresponding information to microcomputer 42 to adjust the stepping frequency of stepping motors 12 and 31 to 800 Hz. Finally, both counting registers R4 and the timer register are cleared and both are available for a new speed checking.

In accordance with the potential distribution on the two lines 89 and 90, the timer of microcomputer 42 is loaded with another number, so that the repeated runs of subroutine "timer I" within identical periods of time vary in the above described manner whereby the sequence in time of the intermediate steps executed by stepping motors 12 and 31 is adjusted to the sewing speed.

While a specific embodiment of the invention has been shown and described in detail to illustrate the application of the principles of the invention, it will be understood that the invention may be embodied otherwise without departing from such principles.

What is claimed is:

1. A sewing machine comprising:
   a main shaft;
   a needle bar operatively connected to said main shaft for performing strokes with rotation of said main shaft;
   a swing arm engaged with said needle bar for vertically guiding said needle bar and movable to adjust a lateral stitch bight of said needle bar;
   a feed dog movable with respect to said needle bar and having a setting member movable to adjust a feed length of said sewing machine;
   a first microcomputer;
   at least one of a stepping motor connected to said swing arm and a stepping motor connected to said setting member, said at least one stepping motor connected to said first microcomputer and controlled thereby to adjust at least one of the lateral stitch bight and feed length;
   a second microcomputer connected to said stepping motor and operable to control variations in a stepping frequency of said stepping motor in proportion to speed variations of the sewing machine main shaft; and
   a pulse transmitter connected to said second microprocessor and associated with said main shaft for generating pulses at a rate corresponding to an instantaneous speed of the main shaft.

2. A sewing machine comprising:
   a main shaft;
   a needle bar operatively connected to said main shaft for performing strokes with rotation of said main shaft;
   a swing arm engaged with said needle bar for vertically guiding said needle bar and movable to adjust a lateral stitch bight of said needle bar;
   a feed dog movable with respect to said needle bar and having a setting member movable to adjust a feed length of said sewing machine;
   at least one of a stepping motor connected to said swing arm and a stepping motor connected to said setting member;
   measuring means associated with said main shaft for measuring an instantaneous speed of said main shaft;

motor control means connected to said at least one stepping motor for varying the stepping frequency thereof;

information transmitting means connected to said measuring and motor control means, and responsive to an instantaneous speed of said main shaft to transmit speed information corresponding to the instantaneous speed to said motor control means to control the stepping frequency;

said motor control means comprising a microcomputer, said measuring means comprising a pulse transmitter connected to said microcomputer and associated with said main shaft for generating pulses at a rate corresponding to an instantaneous speed of said main shaft;

a counter connected to said microcomputer which is controlled by a constant pulse train and by which a time interval between every two pulses of said pulse transmitter is converted into a digital counter signal, said digital counter signal being applied to a second microcomputer having a timer controlling said at least one stepping motor, the time intervals between the consecutive steps of said stepping motor being determined by said timer.

3. A control device according to claim 2 wherein said timer comprises a digital counter which is connected to the counter of said first mentioned microcomputer.

* * * * *